US007192016B2

(12) United States Patent
Fukunaga et al.

(10) Patent No.: US 7,192,016 B2
(45) Date of Patent: Mar. 20, 2007

(54) TORSION SPRING ASSEMBLING STRUCTURE

(75) Inventors: Katsutoshi Fukunaga, Chiryu (JP); Takashi Nishio, Chita (JP); Sigeru Tanabe, Obu (JP); Akira Muramatsu, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 101 days.

(21) Appl. No.: 10/975,983

(22) Filed: Oct. 29, 2004

(65) Prior Publication Data

US 2005/0093215 A1 May 5, 2005

(30) Foreign Application Priority Data

Oct. 30, 2003 (JP) ............................ 2003-371025

(51) Int. Cl.
*F16F 1/06* (2006.01)

(52) U.S. Cl. ...................................... 267/174; 267/154

(58) Field of Classification Search ................ 267/174, 267/173, 154, 155, 273, 25, 26

See application file for complete search history.

(56) References Cited

FOREIGN PATENT DOCUMENTS

| | | | |
|---|---|---|---|
| JP | 07217684 A | * | 8/1995 |
| JP | 8-121517 A | | 5/1996 |

* cited by examiner

*Primary Examiner*—Melanie Torres
(74) *Attorney, Agent, or Firm*—Buchanan Ingersoll & Rooney PC

(57) ABSTRACT

A torsion spring assembling construction includes a base member including an engaging hole, a movable member rotatably supported at the base member and rotatable about an axis for defining a first position and a second position, a long hole formed at the movable member, a torsion spring, and a fixed guide for setting a second end of the torsion spring at the second hole by moving the second end of the torsion spring from the first hole to the second hole upon rotation of the movable member. A first end of the torsion spring is inserted into the engaging hole and a second end of the torsion spring is inserted into the long hole. The long hole includes a first hole extended diagonally radial direction relative to the axis and a second hole in communication with the first hole relative to the radially external direction.

12 Claims, 2 Drawing Sheets

TORSION SPRING ASSEMBLING STRUCTURE

CROSS REFERENCE TO RELATED APPLICATIONS

This application is based on and claims priority under 35 U.S.C. §119 with respect to Japanese Patent Application No. 2003-371025 filed on Oct. 30, 2003, the entire content of which is incorporated herein by reference.

FIELD OF THE INVENTION

The present invention relates to a torsion spring. More particularly, the present invention pertains to a torsion spring assembling structure.

BACKGROUND

Torsion springs are used as a biasing means for regulating a movable member at a first position and at a second position relative to a base member. For example, JPH08(1996)-121517A discloses a torsion spring assembling construction including a movable member having an engaging hole configured to be engaged with a first end of a torsion spring, a base member having a click hole configured to be engaged with a second end of the torsion spring, and an axis for pivotally supporting the movable member relative to the base member. With the construction of JPH08(1996)-121517A, while the first end of the torsion spring is engaged with the engaging hole, the second end of the torsion spring is assembled to a communication hole in communication with the click hole at non-compressed state. By rotating the movable member at the foregoing state, the second end of the torsion spring is moved from the communication hole to the click hole to set the torsion spring at a predetermined state.

Notwithstanding, with the construction of JPH08(1996)-121517A, because the torsion spring is provided outside the rotation range of the movable member, the base member is required to be provided with a long hole including the click hole and the communication hole engaged with the second end of the torsion spring at the outside of the rotation range of the movable member, which increases the required space for the assembly.

A need thus exists for a torsion spring assembling construction with smaller construction.

SUMMARY OF THE INVENTION

In light of the foregoing, the present invention provides a torsion spring assembling construction, which includes a movable member rotatably supported at a base member including an engaging hole. The movable member is rotatable about an axis for defining a first position and a second position. The torsion spring assembling construction further includes a long hole formed at the movable member, and a torsion spring. A first end of the torsion spring is inserted into the engaging hole and a second end of the torsion spring is inserted into the long hole for applying biasing force to the movable member. The long hole includes a first hole extended diagonally radial direction relative to the axis and a second hole connecting to the first hole relative to the radially external direction. The torsion spring assembling construction still further includes a fixed guide for setting the second end of the torsion spring at the second hole by moving the second end of the torsion spring from the first hole to the second hole upon rotation of the movable member.

According to another aspect of the present invention, a torsion spring assembling construction includes a base member including an engaging hole, a movable member pivotally supported relative to the base member for defining a first position and a second position about an axis, a long hole formed at the movable member, and a torsion spring. A first end of the torsion spring is inserted into the engaging hole and a second end of the spring is inserted into the long hole formed at the movable member for applying biasing force to the movable member. The long hole includes a first hole extended diagonally radial direction relative to the axis and a second hole connecting to the first hole relative to the radially external direction. The torsion spring assembling construction still further includes a fixed guide for setting the second end of the torsion spring at the second hole by moving the second end of the torsion spring from the first hole to the second hole upon rotation of the movable member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
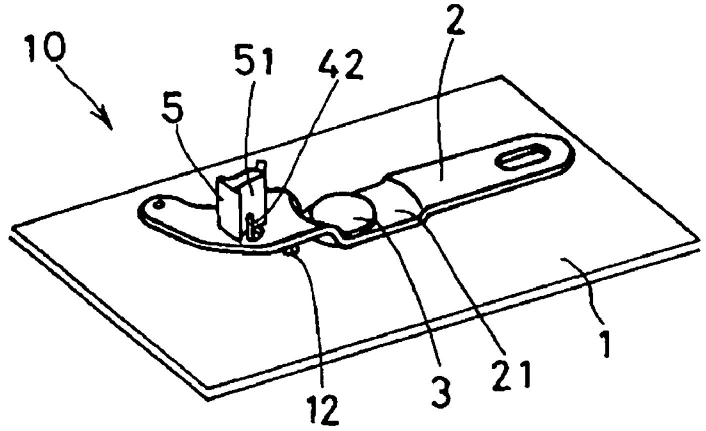
FIG. 1 shows an overview of a torsion spring assembling structure according to an embodiment of the present invention.
Figure 2:
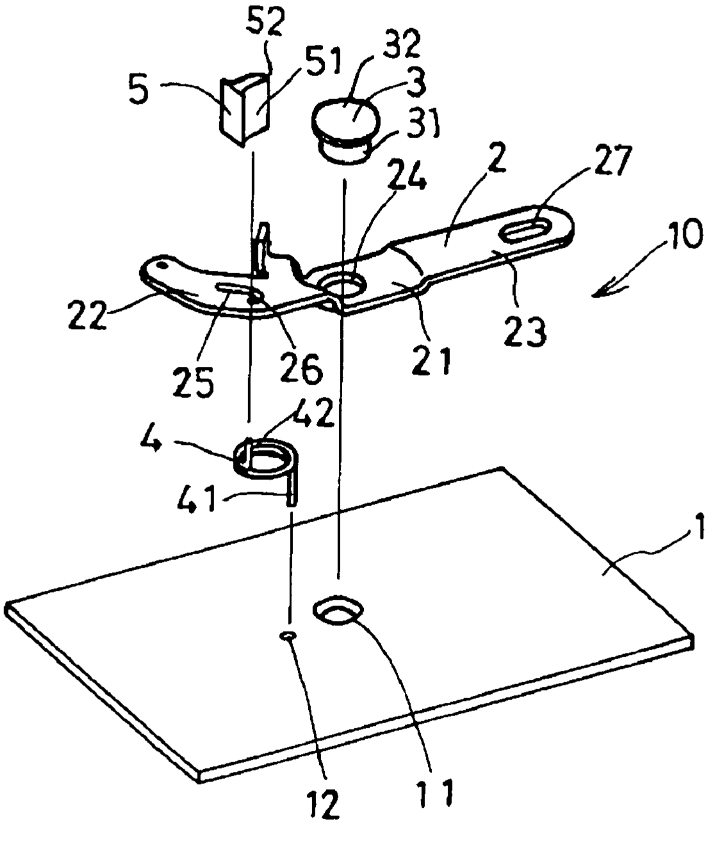
FIG. 2 shows an exploded perspective view of the torsional spring assembling structure according to the embodiment of the present invention.

One embodiment of the present invention will be explained with reference to the illustrations of the drawing figures as follows.

As shown in FIG. 1, an assembling body 10 is set at a predetermined position after assembling a torsion spring 4 to a base member 1.

The base member 1 made of resin or metal includes a plane surface on which a movable member 2 is assembled. The base member 1 includes an assembling hole 11 which is formed by the press working and is configured to be assembled with a pin 3 serving as an axis. The base member 1 is further formed with an engaging hole 12 formed by the press working in the vicinity of the assembling hole 11. The engaging hole 12 is configured to be engaged with a first end 41 of the torsion spring 4. A diameter of the assembling hole 11 is configured to be slightly larger than a diameter of the pin (i.e., axis) 3 for assembling the movable member 2 to the base member 1. A diameter of the engaging hole 12 is configured to be slightly larger than wire diameter of the torsion spring 4, which is the size that the torsion spring 4 is not disengaged.

The movable member 2 made of metal is applied with the press working to be formed with a hole 24 configured to place the pin 3 inserted from upward at a central portion 21. An arm 23 formed with a long hole 27 configured to cooperate with another mechanism is extended in a first direction from the central portion 21. An operational portion 22 is formed at the opposite side of the arm 23. The movable member 2 is rotatably supported about the pin 3 by inserting the pin 3 having a head portion 32 to place into the hole 24 at the central portion 21 from upward and by caulking a tip end 31 of the pin 3 placed in the hole 24. Thus, the operational portion 22 and the arm 23 of the movable portion 2 are arranged in parallel each other relative to the axial direction adjacent to the central portion 21.

A variant long hole is formed at the operational portion 22. The variant long hole includes a first hole 25 and a second hole 26. The first hole 25 has the function for tentatively assembling the torsion spring 4 at the assembling of the torsion spring 4. The first hole 25 is extended directing to diagonally radial direction relative to the center of the pin 3. The second hole 26 is formed continuously from the first hole 25 such that the first hole 25 and the second hole 26 are configured to be the dogleg long hole.

As shown in FIG. 1, a pillar shaped fixed guide 5, which is placed on the first hole 25, is provided in parallel with the pin 3. The fixed guide 5 is, for example, formed on the back surface of a housing cover. An arc portion 51 is provided at a lateral surface of the fixed guide 5. In case the base member 1 corresponds to a hollow case (i.e., a case constructed by coupling two housings or a case constructed by coupling a housing and the housing cover), the fixed guide 5 is provided being projected from an inner wall of the case (i.e., either the housing or the housing cover) either unitarily with the case or separated from the case. Thus, upon the rotation of the movable member 2 about the pin 3, the relative position of the movable member 2 relative to the pin 3 is not deviated, and the position is securely maintained. The arc portion 51 smoothly guides a second end 42 of the torsion spring 4, extended from the ring shaped torsion spring 4 in the axial direction. The arc portion 51 is formed such that an end portion 52 facing the pin 3 is directed to the center of the pin 3. Accordingly, by rotating the arm 23 of the movable member 2 clockwise of FIG. 1, the second end 42 of the torsion spring 4 positioned in the variant long hole is guided from the first hole 25 to the second hole 26 such that the second end 42 of the torsion spring 4 positioned within the rotation range of the movable member 2 can be securely set in the second hole 26.

The assembling process of the torsion spring 4 will be explained as follows. In order to assemble the assembling body 10 shown in FIG. 1, first, the first end 41 of the torsion spring 4 is positioned at the engaging hole 12 to engage the first end of the torsion spring 4 with the base member 1. After positioning the hole 24 of the movable member 2 to be inserted with the pin 3 at the assembling hole 11 formed on the base member 1, the pin 3 is inserted into the assembling hole 11 and the hole 24 from the upward of the movable member 2 to be placed therein. Thereafter, by caulking the tip end 31 of the pin 3, the movable member 2 is pivotally supported by the pin 3 relative to the base member 1. Upon the assembling of the movable member 2 on the base member 1, the second end 42 of the torsion spring 4 is positioned in the first hole 25 formed at the operational portion 22 with the non-compressed state. Placing the second end 42 of the torsion spring 4 in the first hole 25 with the non-compressed state, a tip end of the second end portion 42 of the torsion spring 4 is projected from the first hole 25.

Figure 3A:
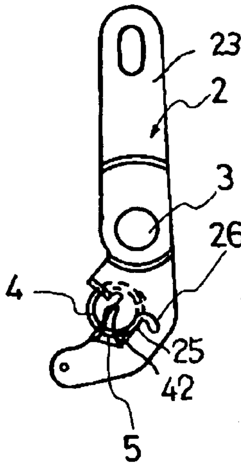
FIGS. 3*a*–3*d* are explanatory views for an assembling process of the torsional spring assembling structure according to the embodiment of the present invention.
Figure 3B:
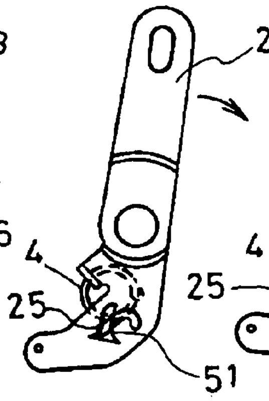

At the foregoing state, for example, the housing cover is provided from the upward of the pin 3 for covering the movable member 2. Thus, the tip end of the second end 42 of the torsion spring 4 contacts the arc portion 51 of the fixed guide 5, for example, formed on the back of the housing cover, and the second end 42 of the torsion spring 4 contacts a most external side of the first hole 25 relative to the pin 3 (shown in FIG. 3*a*). By rotating the arm 23 of the movable member 2 clockwise as shown in FIG. 3*b* at the state of FIG. 3*a*, the second end 42 of the torsion spring 4 is apart from the most external end of the first hole 25 by the arc portion 51 of the fixed guide 5 in accordance with the clockwise rotation of the arm 23, and the second end 42 is compressed towards the first end 41 against the biasing force along the configuration of the first hole 25. By further rotating the arm 23, the second end 42 of the torsion spring 4 reaches the boarder (i.e., the position where the direction of the hole is changed) between the first hole 25 and the second hole 26. Upon the further rotation of the arm 23 from the boarder position, a circumferential spring body of the torsion spring 4 rotates counterclockwise about the first end 41 engaged with the engaging hole 12. Accordingly, the second end 42 of the torsion spring 4 spread towards the second hole 26 extended in the radial direction that is changed from the first hole 25, and contacts the end portion (i.e., the most external portion relative to the pin 3) of the second hole 26 to be set (i.e., shown in FIG. 3*c*). At the state shown in FIG. 3*c*, the position of the torsion spring 4 is determined at the normal position, and the movable member 2 is maintained either at a first position or a second position by the biasing force of the torsion spring 4. The second end 42 of the torsion spring 4 positioned in the second hole 26 by the fixed guide 5 is unlikely disengaged simply by rotating the movable member 2. In this case, the second end 42 of the torsion spring 4 is guided by the arc portion 51 of the fixed guide 5 which guide from the first hole 25 to the second hole 26 (i.e., shown in FIG. 4).

Figure 3C:
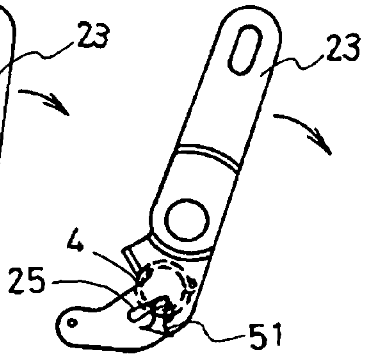
Figure 3D:
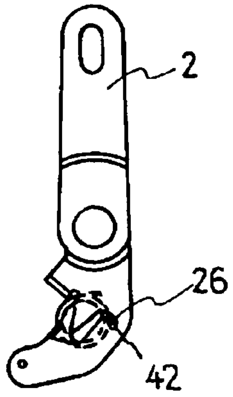
Figure 4:
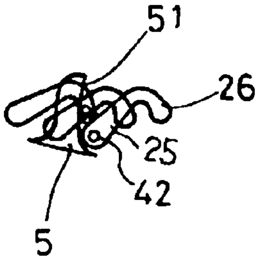
FIG. 4 is shows the torsional spring assembling structure according to the embodiment of the present invention.
Figure 5A:
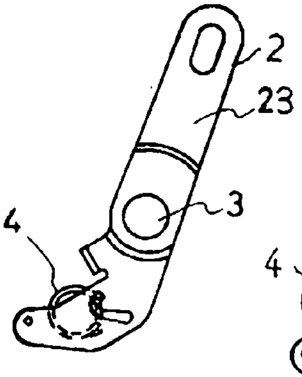
FIGS. 5*a*–5*b* are explanatory views for operation of the torsional spring assembling structure according to the embodiment of the present invention.
Figure 5B:
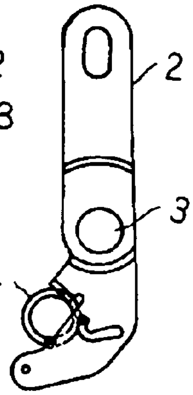

At the state shown in FIG. 3*c*, by rotating the arm 23 counterclockwise as shown in FIG. 3*d*, the movable member 2 can be maintained, for example, at the first position shown in FIG. 5*a* and the second position shown in FIG. 5*b* using the biasing force of the torsion spring 4 at the state that the first end 41 of the torsion spring 4 is inserted into the engaging portion 12 and the second end 42 is inserted into the second hole 26. In other words, the movable member 2 is rotated within the rotation range between the first position and the second position. In case one of the first position and the second position is determined as an initial position of the movable member 2, for example, the movable member 2 is operated to rotate from the initial position, and thereafter, the predetermined position of the movable member is maintained using the biasing force of the torsion spring 4 for returning the movable member 2 to the initial position.

With the construction of the embodiment of the present invention, even if the torsion spring 4 is returned from the second hole 26 to the tentative assembling state in the first hole 25 due to the manmade external force and the impact on the second end 42 of the torsion spring 4, the second end 42 can be set at the second hole 26 again by conducting the operation of the arm 23 of the movable member 2 shown in FIGS. 3*a*–3*c*, thus, it is easily automatically regressed The assembling body 10 of the embodiment of the present invention is used for returning the movable member 2 to the initial position after operating the movable member 2 in one direction. For example, the assembling body 10 is applicable to door lock devices, outside door handles, and inside door handles, or the like as far as concerning the vehicle.

Although the arc shaped holes are applied at the first hole 25 and the second hole 26, the configuration of the holes 25, 26 may be straight as long as the second end 42 of the torsion spring 4 is guided.

The torsion spring 4 may not include the circumferential portion. Further, the first end 41 of the torsion spring 4 is not necessarily directly engaged with the engaging hole 12 of the base member 1, and the first end 41 of the torsion spring 1 may be engaged with the engaging hole 12 via a separate member.

According to the embodiment of the present invention, because the long hole includes the first hole extended in the diagonally radial direction relative to the axis and the second hole in communication with the first hole in the radially external direction, the torsion spring can be set by moving the second end of the torsion spring from the first hole to the second hole in accordance with the rotation of the movable member. With the foregoing construction, because the second end of the torsion spring is engaged with the first hole and the second hole provided at the movable member and the torsion spring is positioned within the rotation range of the movable member, it is advantageous regarding the space to achieve the smaller torsion spring assembling construction.

With the construction of the embodiment of the present invention, because the fixed guide is extended directed to the axis, the second end of the torsion spring is set in the second hole after pushed by the fixed guide towards the axis. Thus, the torsion spring can be positioned surrounding the axis conducting the rotation of the movable member, and the size of the torsion spring assembling construction can be reduced.

With the construction of the embodiment of the present invention, the fixed guide includes the arc portion for guiding the second end of the movable member in accordance with the rotation of the movable member. Thus, the second end is smoothly guided by the arc portion of the fixed guide to be set in the second hole.

With the construction of the embodiment of the present invention, the fixed guide guides the second end of the torsion spring in accordance with the rotation of the movable member, and sets the second end in the second hole after approximating the second end to the first end against the biasing force of the torsion spring. Thus, because the torsion spring is provided within the rotation range of the movable member and the second end can be set in the second hole by approximating to the first end, the size of the torsion spring assembling construction can be reduced.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A torsion spring assembly comprising:

a movable member pivotally mounted on a base member and movable between first and second angular positions and biased to either one of the first and second angular positions by an overcentre torsion spring which has one end portion anchored to the base member and an other end portion received in an engagement hole in the movable member;

the engagement hole being an elongate acute-angle hole comprising a first linear portion and a second linear portion that communicate with one another and form an acute angle therebetween;

whereby on initial assembly said other end portion of the torsion spring is placed in the first linear portion of the engagement hole while the spring is in a relaxed condition, and to prime the torsion spring assembly prior to use said other end portion of the torsion spring is moved along the first linear portion of the engagement hole and into the second linear portion accompanied by torsioning of the torsion spring; and a guide member immovably fixed relative to the base member and located to contact said other end portion of the torsion spring to move said other end portion along the first portion of the engagement hole and into the second portion on pivotal movement of the movable member to its second angular position.

2. A torsion spring assembly construction according to claim 1, wherein the fixed guide member includes an arcuate portion for guiding said other end portion of the torsion spring on pivotal movement of the movable member to its second angular position.

3. A torsion spring assembly construction according to claim 2, wherein the arcuate portion of the guide member smoothly guides the other end portion of the torsion spring.

4. A torsion spring assembly construction according to claim 1, wherein the second linear portion of the elongate hole possesses an angle and a length such that the other end portion of the spring remains in the second linear portion on return of the movable member to its first position.

5. A torsion spring assembly construction according to claim 2, wherein the second linear portion of the elongate hole possesses an angle and a length such that the other end portion of the spring remains in the second linear portion on return of the movable member to its first position.

6. A torsion spring assembly construction according to claim 3, wherein the second linear portion of the elongate hole possesses an angle and a length such that the other end portion of the spring remains in the second linear portion on return of the movable member to its first position.

7. A torsion spring assembly construction according to claim 1, wherein the guide member is a portion of a case or housing for the assembly.

8. A torsion spring assembly construction according to claim 2, wherein the guide member is a portion of a case or housing for the assembly.

9. A torsion spring assembly construction according to claim 3, wherein the guide member is a portion of a case or housing for the assembly.

10. A torsion spring assembly construction according to claim 4, wherein the guide member is a portion of a case or housing for the assembly.

11. A torsion spring assembly construction according to claim 5, wherein the guide member is a portion of a case or housing for the assembly.

12. A torsion spring assembly construction according to claim 5, wherein the guide member is a portion of a case or housing for the assembly.

* * * * *